United States Patent
Bergholt et al.

(10) Patent No.: US 6,916,138 B2
(45) Date of Patent: Jul. 12, 2005

(54) VIBRATION DAMPENED DRILLING TOOL

(75) Inventors: Marie-Louise Bergholt, Sandviken (SE); Leif Karlsson, Karlholmsbruk (SE); Tommy Tukala, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 117 days.

(21) Appl. No.: 10/311,540

(22) PCT Filed: Jun. 1, 2001

(86) PCT No.: PCT/SE01/01247

§ 371 (c)(1),
(2), (4) Date: Mar. 14, 2003

(87) PCT Pub. No.: WO01/98008

PCT Pub. Date: Dec. 27, 2001

(65) Prior Publication Data

US 2003/0170084 A1 Sep. 11, 2003

(30) Foreign Application Priority Data

Jun. 20, 2000 (SE) .............................. 0002294

(51) Int. Cl.⁷ ............................................. B23B 51/02
(52) U.S. Cl. ..................................... 408/143; 409/141
(58) Field of Search ................................ 408/143, 226; 175/320, 321, 322, 323; 409/141

(56) References Cited

U.S. PATENT DOCUMENTS

| | | | | |
|---|---|---|---|---|
| 2,610,529 A | * | 9/1952 | Atkinson | 408/59 |
| 3,292,237 A | * | 12/1966 | Fisher | 407/120 |
| 3,842,942 A | * | 10/1974 | Jensen et al. | 181/207 |
| 4,338,758 A | * | 7/1982 | Hagbjer | 52/745.2 |
| 4,393,947 A | | 7/1983 | Lutze et al. | |
| 4,591,009 A | | 5/1986 | Marcel et al. | |
| 4,993,894 A | * | 2/1991 | Fischer et al. | 408/14 |

FOREIGN PATENT DOCUMENTS

| | | | | |
|---|---|---|---|---|
| CH | 592 489 | | 10/1977 | |
| EP | 0 090 929 | | 2/1983 | |
| EP | 0 090 926 | | 10/1983 | |
| GB | 2035184 | * | 6/1980 | 408/143 |
| SE | 468930 | | 4/1993 | |
| SU | 1171240 | * | 8/1985 | 408/143 |
| SU | 1669638 | * | 8/1991 | 408/143 |
| SU | 559779 | * | 6/1997 | 408/143 |

OTHER PUBLICATIONS

Abstract for EPO 0090929.*

* cited by examiner

*Primary Examiner*—Daniel W. Howell
(74) *Attorney, Agent, or Firm*—Burns, Doane, Swecker & Mathis, LLP

(57) ABSTRACT

A drilling tool includes a drill body having chip channel formed therein and carrying cutting inserts at front ends of respective chip channels. Disposed in the chip channels at a location spaced from the cutting insert are respective damping elements. Each damping element comprises first and second portions formed of respective materials of different rigidity.

20 Claims, 6 Drawing Sheets

VIBRATION DAMPENED DRILLING TOOL

BACKGROUND

The present invention relates to a drilling tool for working in metallic material, more precisely a drill of the type that comprises a drill body having at least one cutting insert which defines the periphery of the hole, the drill being formed with one or more recesses extending in the longitudinal direction of the drill which recesses join to the outer and inner inserts, respectively, in order to serve as grooves for chip release.

At working of holes in metallic materials, problems arise with the high sound level caused by vibrations from the working and the machine sound. Hitherto used drills have not been provided with built-in/added damping devices formed in such a way that a suitable sound and vibration damping has been feasible. The essential thing is to be able to eliminate major parts of the vibration sound in the range that is uncomfortable to the ear. If possible, only the machine sound as well as the inevitable chip rattle which normally usually amounts to 74–76 dB should be left. However, without damping it is not uncommon that levels up to 130 dB have been measured. The proper machine sound feels more restful to the ear.

By the Swedish patent 468,930, it is, for instance, previously known to form a drilling tool with a partly vibration damping material, which has been applied in the recess of the drill's chip channels formed in the longitudinal direction. However, the hard metal borders applied according to the SE-468,930 have not turned out to give any suitable silencing of noise.

SUMMARY OF THE INVENTION

In these circumstances, the aim of the invention is to provide a solution to the above-mentioned problem by forming a device for a drill which gives a substantially better sound and vibration damping effect, and which is useful at tapping as well as at the subsequent drilling. According to the invention, the drill is provided with at least two composed damping elements having different rigidity are applied at an axial distance behind the cutting inserts. In this way, the drill is given above all sound and vibration damping and also improved rigidity. As a result of this, the new tool permits a substantial reduction of the sound level that is caused by the proper metal working of the workpiece. At the same time, such a tool becomes less sensitive to vibrations, which arise by virtue of variations of the cutting forces.

BRIEF DESCRIPTION OF DRAWINGS

Below, the invention will be described closer in connection with two embodiment examples of the invention illustrated in the drawings, wherein.

DESCRIPTION OF PREFERRED EMBODIMENTS OF THE INVENTION

Figure 1:
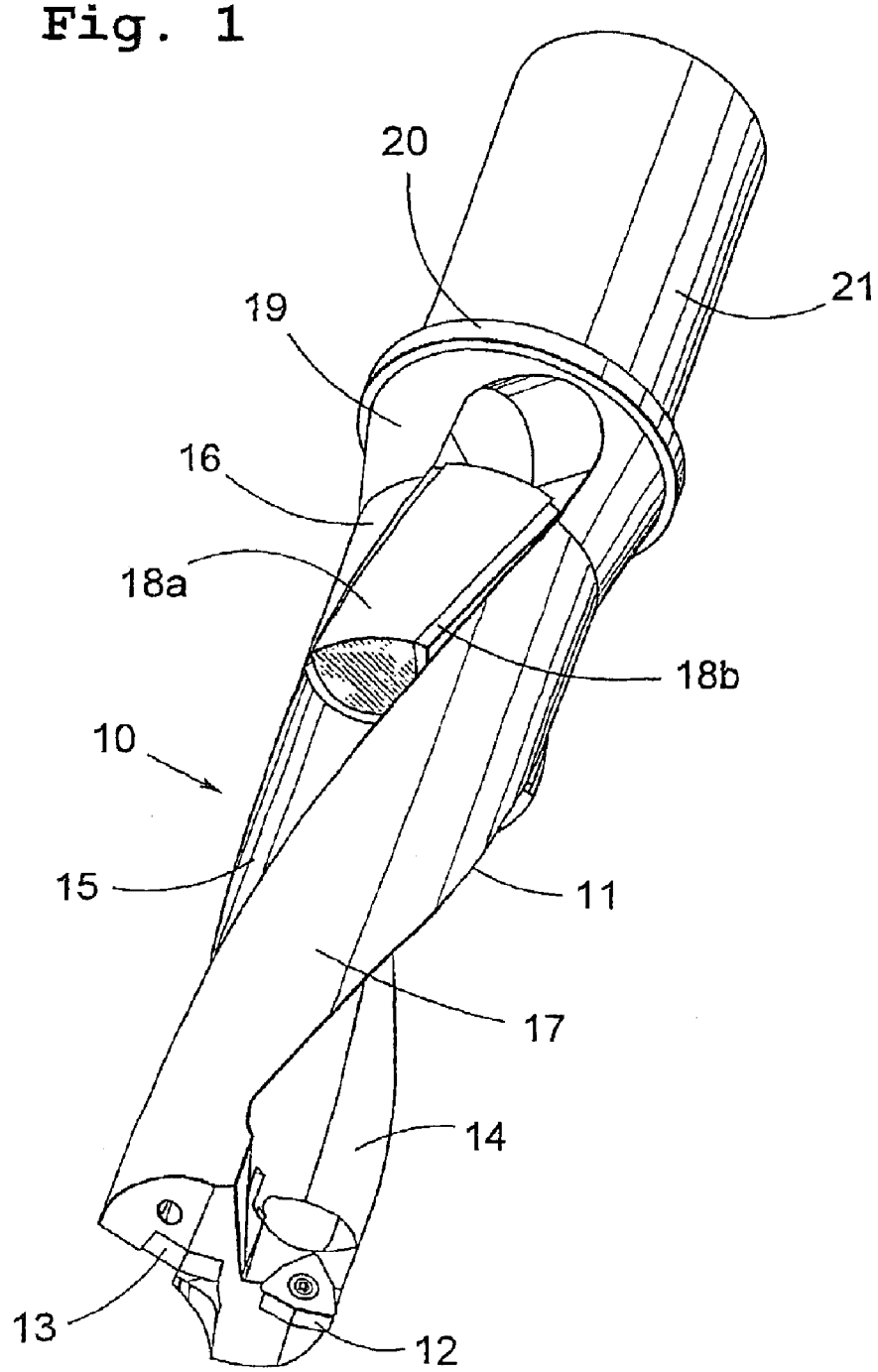
FIG. 1 shows a perspective view of an embodiment of the tool.

The embodiment of a drill 10 having damping elements 18a and 18b according to the present invention illustrated in FIG. 1 comprises a drill body 11 as well as an outer cutting insert or plate 12 situated at the periphery of the drill and an inner cutting insert or plate 13 situated closer to the center of the drill. The cutting plates are preferably made of hard cemented carbide. The two cutting plates are situated in such a way at different radial distances from the drill axis A that their operating areas overlap each other. At the same time, said cutting plates are displaced about 180° in the periphery direction of the tool. The cutting plates 12 and 13 are, in a known way, for instance by means of screw joints, fastened in a corresponding cutting pocket in the drill body 11. The drill body 11 has a substantially cylindrical basic shape and is made out of steel.

At the portion of the drill body 11 situated behind the cutting inserts, the drill body is provided with axially extending, radially outwardly open recesses 14 and 15, which in cross-section are concavely bent and separately join to respective cutting plates 12 and 13. Said recesses 14, 15 are intended to serve as chip channels and bars 16 and 17 having a cylindrical envelope surface are situated therebetween. In the embodiment illustrated in FIG. 1, said chip channels 14, 15 are helical. Alternatively, the chip channels 14, 15 may have a straight design or a combination of straight and helical. A distance axially behind the cutting plates 12, 13, damping elements 18 have been placed in one or each one of the chip channels. The damping element 18 is composed of at least two parts 18a and 18b having substantially different rigidities. In the case illustrated here, the damping element portion 18a is applied with a shape adapted to the chip channel so that the top surface of the damping element portion 18a becomes situated flush with, and with the same shape as, the adjacent outer surface of the drill body 11. The damping element 18 has a shape that entirely or partly corresponds with the shape of the wall of the chip channel, while the outer envelope surface thereof may have a free design. The damping element portion 18a may, for instance, be fastened at the drill shank by means of a radial screw joint. The damping element 18 should, in order to give the desired damping effect, be situated at an axial distance behind the cutting plates so that an undisturbed chip release is obtained at a predetermined bore depth. The drill body 11 is, at the axially rear portion thereof, in the conventional way formed with a rear sectional thickening (i.e., enlarged cross section) in the shape of a conical portion 19 which transforms into a rear portion 20. In certain cases, the damping elements 18 can have such an axial extension that they also are extended through at least a part of said conical portion 19, this with the purpose of allowing a greater bore depth with the existing embodiment. The cylindrical part 21 situated axially behind the portion 20 is intended to be fixed in a machine spindle or holder part. It is not necessary that the shape of the element 18a entirely joins to the shape of the recess 15. The essential thing is that a satisfactory surface contact is secured between the side surfaces of the chip channel and the radially directed side surfaces of the damping element up to the transition to the envelope surface of the bars 16, 17.

Figure 2:
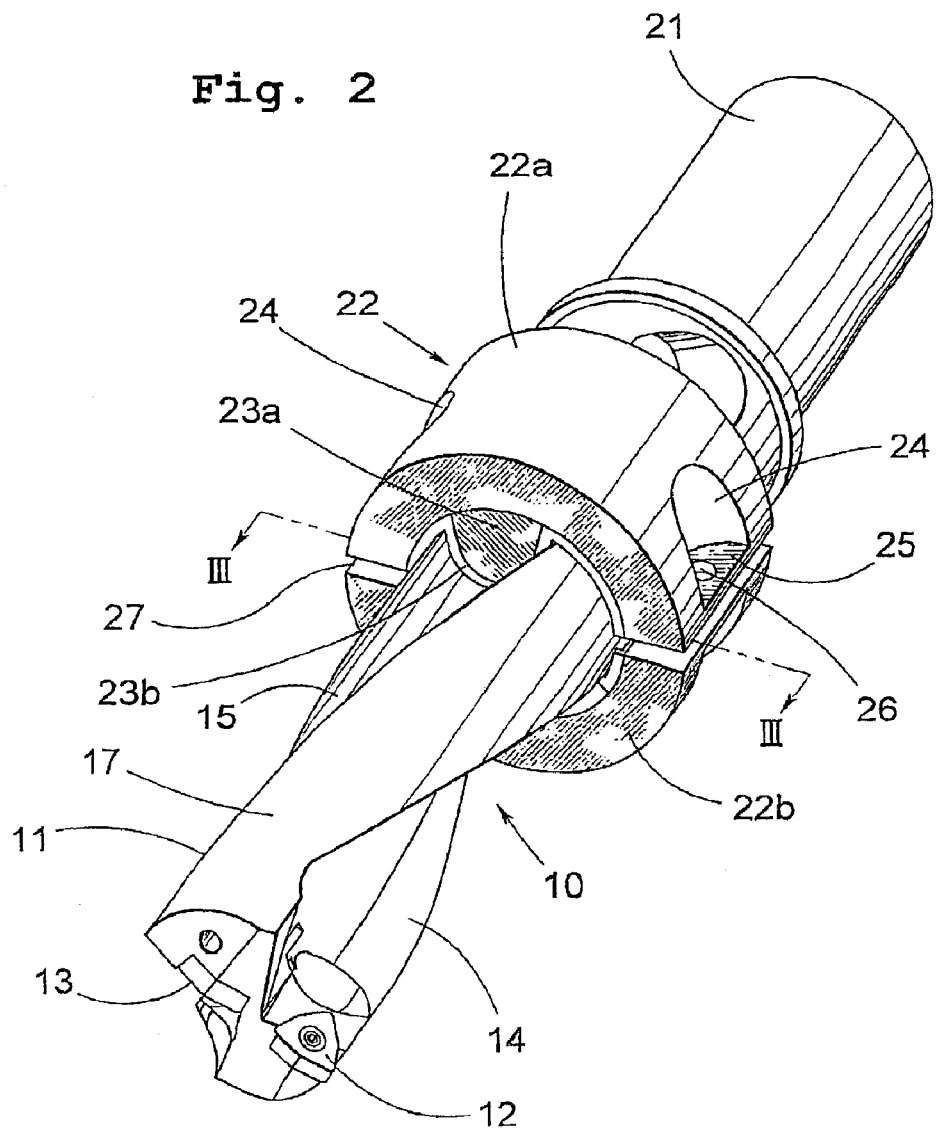
FIG. 2 shows a perspective view of an alternative embodiment.
Figure 3:
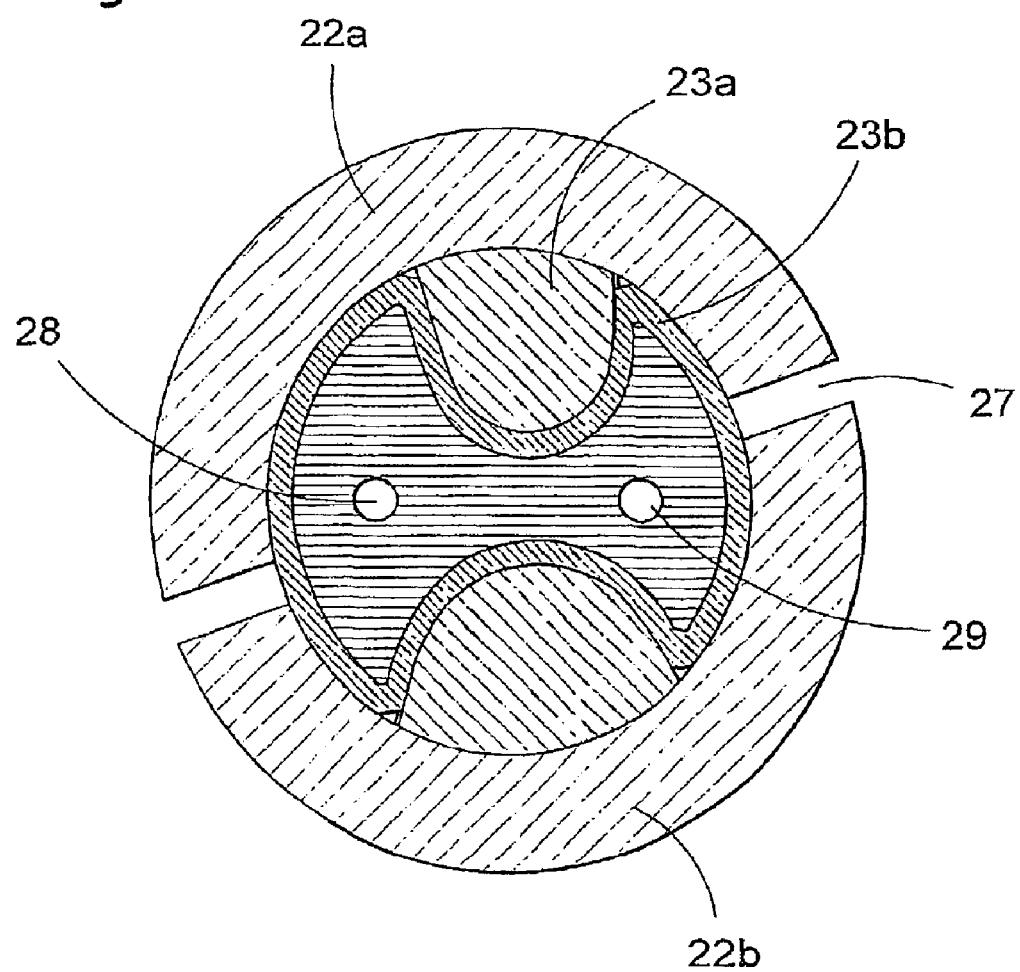
FIG. 3 shows a cross-section through the collar portion along the line III—III of a drill according to FIG. 2.

In FIGS. 2–3, an alternative embodiment is shown where a damping unit is in the form of a cylindrical collar 22 with a substantially larger outer diameter than the drill body 11 and two damping elements 23. Each damping element is comprised of portions 23a and 23b which have been given such a shape that they entirely or partly fill up the recesses 14, 15 along the length of the collar. The part 23b is brought inside the collar 22 entirely or partly in surface contact with the envelope surface of the bars 16, 17 along substantially the entire length of the collar. The portion 23a and 18a, respectively, may be manufactured out of steel for instance, and the portion 23a is fastened at the inner wall of the collar by means of soldering, agglutination, welding or in another suitable way.

Alternatively, the portion 18a, 23a can be manufactured out of a ceramic material, polymer, composite material or cemented carbide. The portion 18b, 23b can be a material of the type elastomer, polymer, natural rubber or a glue and caulking compound. Also combinations of these materials are feasible.

The collar 22 is, in the embodiment illustrated in FIGS. 2–3, composed of two collar halves 22a and 22b, which are held together around the drill body 10 by means of a screw joint. Alternatively, the collar can consist of more than two collar elements, As is seen in FIG. 2, each one of the collar halves is provided with circular recesses 24, in which a bottomed plane portion 25 forms a flange portion through which a hole 26 has been formed for receipt of a bolt or screw (not shown) which extends therethrough and also through the opposite complementarily formed flange portion of the opposite collar halves 22b thereof. The embodiment is such that a slot 27 remains between the two collar halves 22a, 22b. In the embodiment illustrated in FIG. 3, the damping element portion 23b has such a continuous extension that it entirely fills up the two concavely formed chip recesses 14 and 15 as well as entirely surrounding the envelope surface of the bars 16 and 17. Longitudinal channels in the drill body 10 for transportation of cooling liquid up to the bore tip are designated 28 and 29.

Figure 4:
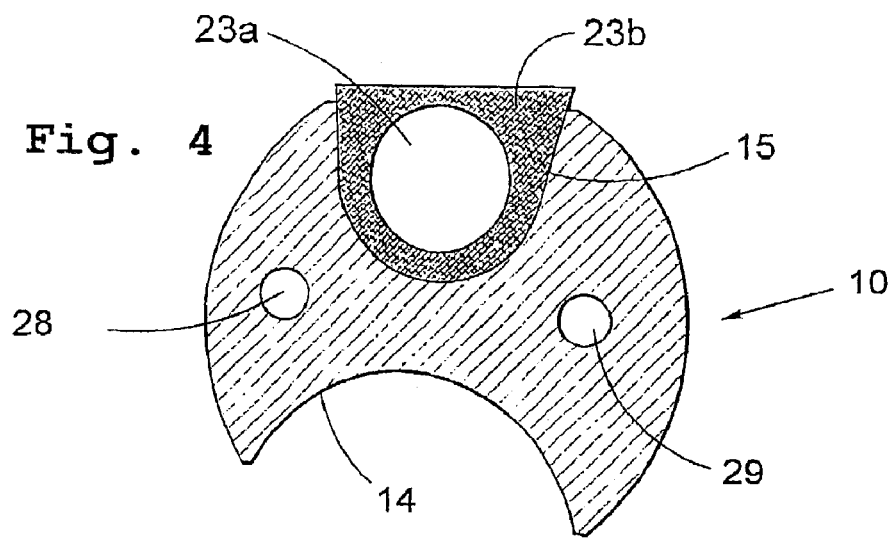
FIGS. 4–11 show cross-sections of respective alternative embodiments of drills within the scope of the invention.
Figure 5:
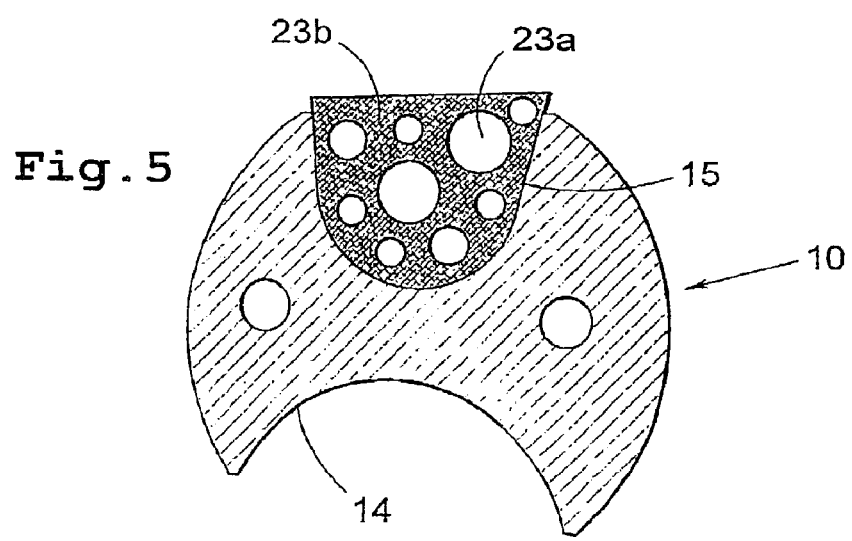
Figure 6:
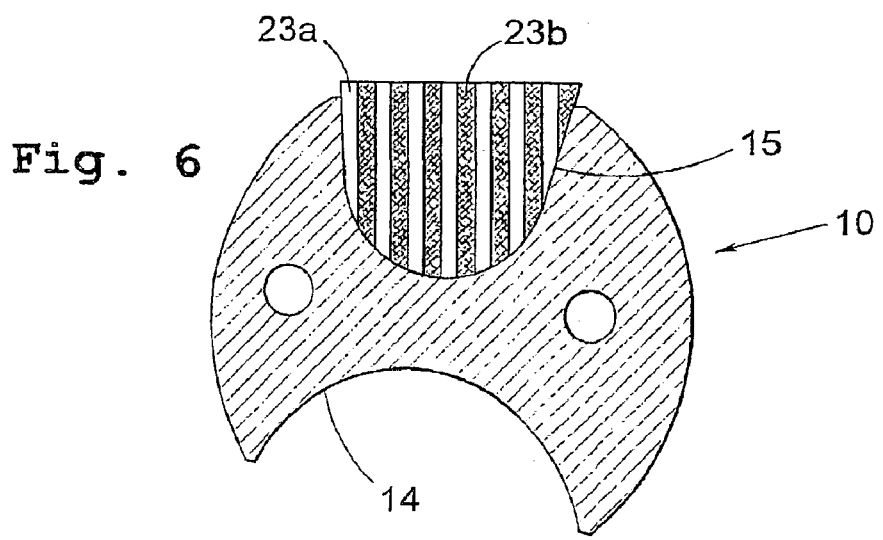

In FIGS. 4–6, alternative embodiments of the damping elements are shown. In FIG. 4, the embodiment is such that the damping material 123a of a typically metallic or ceramic character is entirely embedded and surrounded by the damping material 123b which has a typical rubber character or consists of another elastomer material. This material is intended to entirely fill up the respective chip recess 14, 15.

In the embodiment according to FIG. 5, a plurality of damping bodies 223a having a varying cylindrical cross-section have been embedded in a material 223b of rubber or elastomer. Also in this case, the intention is that the accordingly composed damping unit should entirely fill up the respective chip recess 14, 15.

In the embodiment according to FIG. 6, the damping unit has received a sandwich embodiment, where the typically metallic or ceramic damping material 323a in the form of sheets alternately has been embedded between sheets 323b of the damping material having a typical rubber or elastomer character.

Figure 7:
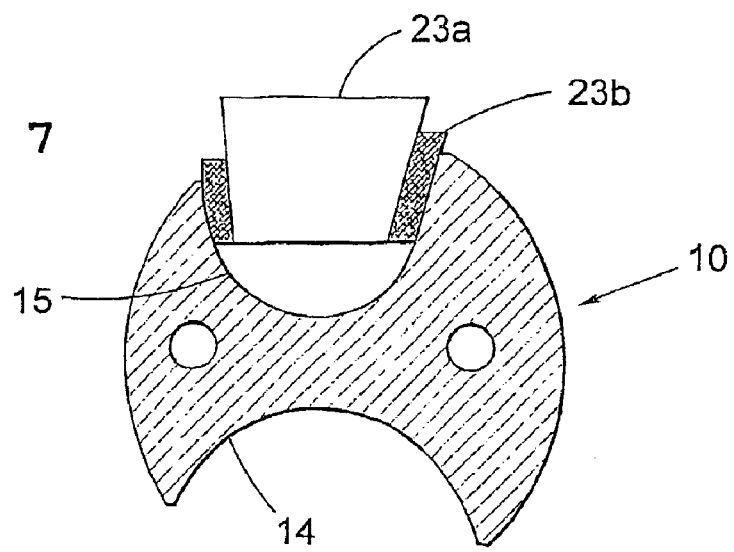

According to the alternative embodiment illustrated in FIG. 7, the typically metallic or ceramic damping material 423a has been given an embodiment being wedge-shaped in cross-section, the same on both sides being surrounded by the material 423b having a typical rubber or elastomer character. In this case, it is not required that the two damping materials in their entirety fill up the respective chip recess 14, 15.

Figure 8:
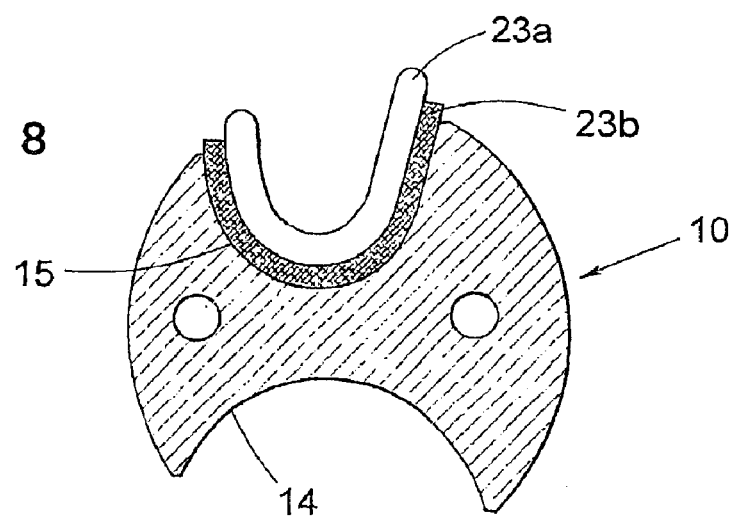

According to FIG. 8, the harder material 523a has been fitted into the recess 15 as a U-shaped segment, which only partly fills up the recess 15. The more elastic damping material, also in the form of an inserted U-shaped segment, is fitted in between the material 523a and the bottom surface of the recess 15.

Figure 9:
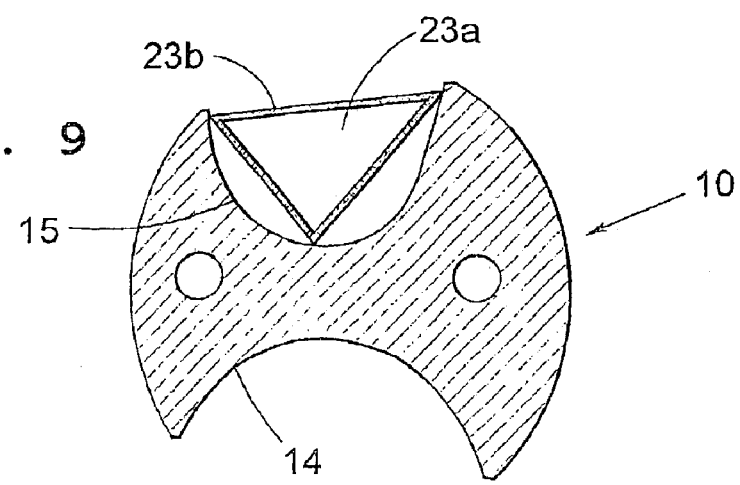

According to the alternative embodiment illustrated in FIG. 9, the typically metallic or ceramic damping material 623a has entirely been enclosed by a damping material 623b of rubber or elastomer character so that the shape of the composed damping units has become triangular. With such an embodiment, it is not required that the two damping materials should entirely fill up the respective chip recess in order to attain a suitable silencing of noise.

Figure 10:
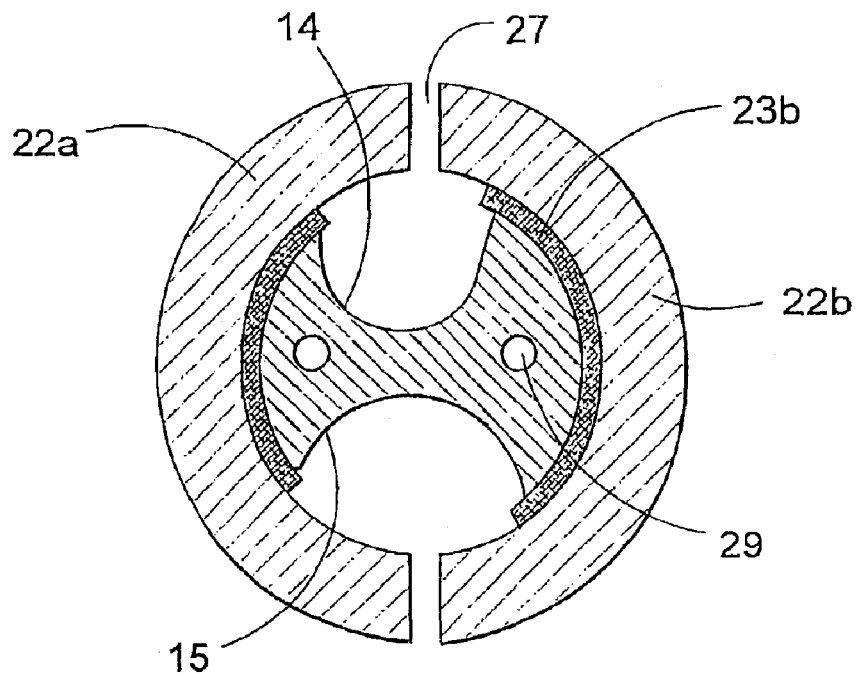

According to an additional alternative embodiment, the damping element consists of the collar 22 together with the more elastic damping material 723b. Such an embodiment is illustrated in FIG. 10. As is seen therein, it is sufficient to let the damping material 723b be extended only along the envelope surfaces of the two bars 16, 17. In such a case, also the slots 27 may have another position than what previously has been shown in FIG. 3. As a suitable material in the collar 22, material of the same type that previously has been indicated for the portion 18a, 23a may then be chosen.

Figure 11:
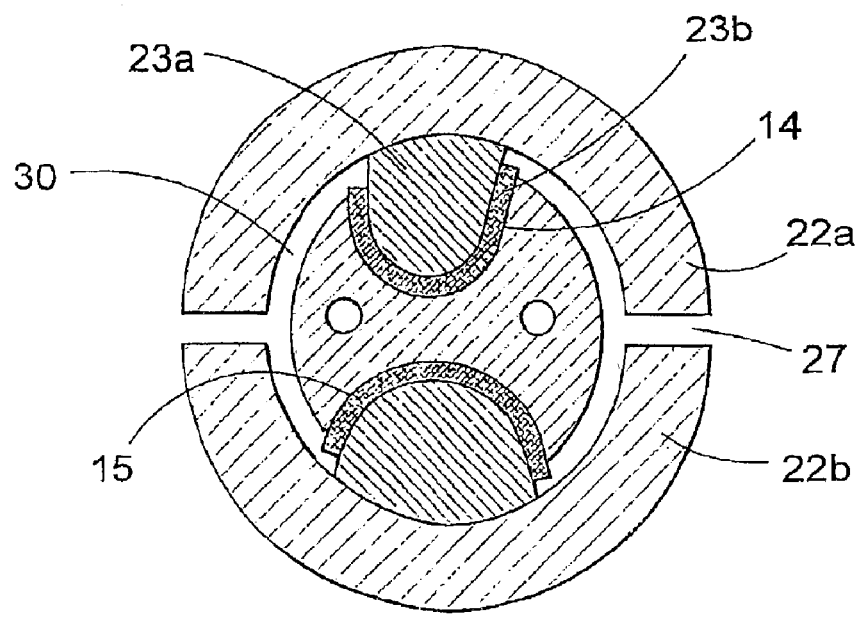

According to an alternative embodiment shown in FIG. 11, the collar 22 is composed of two collar halves 22a and 22b having an axial slot 27 therebetween, but in this case there is no direct surface contact between the collar and the drill body 11, since the inner diameter of the collar is larger than the outer diameter of the drill body 11 so that a ring-shaped gap 30 is formed therebetween. According to this embodiment, the material portions 823a, which consist of metal, ceramics or polymer material, have been fastened at the inner surface of the collar and they have been formed so that they entirely fill up the recesses 14 and 15. Alternatively, the embodiment can be such that said portions 823a only partly fill up the recesses 14 and 15. In view of the illustrated embodiment, the inner envelope surface of the element 23a has been given a convex shape adapted to the shape of the recess 14 while the outer envelope surface thereof has been given a convex shape with a considerably larger bending radius adapted to the inner diameter of the collar half 22. At the same time, the softer and more elastic damping material 823b has been formed as a shim U-shaped in cross-section, which has been fitted in between the portion 823a and the 14 bottom of the recess. The corresponding insert of a harder and a softer damping material has been applied in the diametrically opposite recess 15 in the drill body, as has been shown in FIG. 11.

What is claimed is:

1. Drilling tool for hole-drilling in metallic materials, comprising:
   a drill body defining a longitudinal axis and having longitudinal front and rear portions and a chip channel extending in a generally front-to-rear direction, a cutting edge disposed adjacent a front end of the chip channel; and
   a damping element disposed on the drill body at a distance from the front end of the drill body, the damping element comprising first and second portions formed of respective materials having different respective rigidities wherein the first portion comprises a collar extending around an outer periphery of the drill body, and the second portion is disposed in a radial gap formed between the collar and the drill body, the collar having a greater rigidity than the second portion, the second portion being spaced outwardly from a radially inner portion of the chip channel to permit chips in the chip channel to flow past the second portion.

2. The drilling tool according to claim 1 wherein both of the first and second portions are disposed in the chip channel.

3. The drilling tool according to claim 2 wherein the first and second portions of the damping element comprise respective parallel sheets alternating with one another.

4. The drilling tool according to claim 1 wherein the second portion is disposed entirely out of the chip channel.

5. The drilling tool according to claim 4 wherein the second portion of the damping element is disposed between the first portion and a wall of the chip channel.

6. The drilling tool according to claim 5 wherein the first portion of the damping element has a greater rigidity than the second portion.

7. The drilling tool according to claim 4 wherein there is an additional cutting insert mounted in the front end of the drive body, and a corresponding additional chip channel therefor being formed in the drill body, there being an additional damping element mounted in the additional chip channel and including first and second portions formed of materials of different respective rigidity.

8. The drilling tool according to claim 4 wherein the wall of each chip channel is concavely curved, the chip channels separated by bar portions each having a convexly curved outer envelope surface, the first portion of the damping element comprising an asymmetrical rod having an inner surface conforming to the curvature of the wall of the respective chip channel and an outer surface substantially corresponding to a curvature of the outer envelope surface of the bar portions.

9. Drilling tool for hole-drilling in metallic materials, comprising:
 a drill body defining a longitudinal axis and having longitudinal front and rear portions and a chip channel extending in a generally front-to-rear direction, a cutting edge disposed adjacent a front end of the chip channel; and
 a damping element disposed on the drill body at a distance from the front end of the drill body, the damping element comprising first and second portions formed of respective materials having different respective rigidities, wherein both of the first and second portions are disposed in the chip channel.

10. The drilling tool according to claim 9 wherein the first portion of the damping element has a triangular cross section.

11. The drilling tool according to claim 9 wherein the first portion of the damping element comprises at least one cylinder completely surrounded by the second portion.

12. The drilling tool according to claim 11 wherein the at least one cylinder comprises a plurality of cylinders of different size.

13. The drilling tool according to claim 9 wherein each of the first and second portions of the damping element has a generally U-shaped cross section, the second portion occupying a space formed between the first portion and a wall of the chip channel.

14. The drilling tool according to claim 9 wherein the first portion of the damping element is formed of a material selected from the group consisting of metal, polymer, ceramic, and cemented carbide.

15. The drilling tool according to claim 14 wherein the second portion of the damping element is formed of a material selected from the group consisting of rubber, polymer and elastomer.

16. Drilling tool for hole-drilling in metallic materials, comprising:
 a drill body defining a longitudinal axis and having longitudinal front and rear portions and a chip channel extending in a generally front-to-rear direction, a cutting edge disposed adjacent a front end of the chip channel; and
 a damping element disposed on the drill body at a distance from the front end of the drill body, the damping element comprising first and second portions formed of respective materials having different respective rigidities wherein the damping element further comprises a collar extending around the drill body with the first and second portions disposed within an inner diameter of the collar.

17. The drilling tool according to claim 16 wherein the first portion is disposed in the chip channel and the second portion is disposed outside of the chip channel.

18. Drilling tool for hole-drilling in metallic materials, comprising:
 a drill body defining a longitudinal axis and having longitudinal front and rear portions and a chip channel extending in a generally front-to-rear direction, a cutting edge disposed adjacent a front end of the chip channel; and
 a damping element disposed on the drill body at a distance from the front end of the drill body, the damping element comprising first and second portions formed of respective materials having different respective rigidities, wherein the rear portion of the drill body comprises a cylindrical portion; the drill body including a portion of enlarged cross section disposed in front of the cylindrical rear portion; the damping element joined directly to the portion of enlarged cross section.

19. Drilling tool for hole-drilling in metallic materials, comprising:
 a drill body defining a longitudinal axis and having longitudinal front and rear portions and a chip channel extending in a generally front-to-rear direction, a cutting edge disposed adjacent a front end of the chip channel;
 a damping element disposed on the drill body at a distance from the front end of the drill body, the damping element comprising first and second portions formed of respective materials having different respective rigidities; and
 a collar extending around the drill body;
 wherein the first portion is disposed inside of the collar and within the chip channel, wherein the first portion includes an outer periphery in contact with an inner surface of the collar, and the second portion including a section disposed in a gap formed between an outer surface of the drill body and the inner surface of the collar and being in frictional contact with such inner surface, wherein the first portion has a greater rigidity than the second portion.

20. The drilling tool according to claim 19 wherein the collar comprises two halves separated by two axial slots.

* * * * *